United States Patent
Van Thiel (10) Patent No.: US 11,752,988 B2
(45) Date of Patent: Sep. 12, 2023

(54) ACTUATOR MODULE AND METHOD FOR MEASURING AND PROCESSING A DRIVING DYNAMICS VARIABLE OF A VEHICLE

(71) Applicant: ZF CV Systems Hannover GmbH, Hannover (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 242 days.

(21) Appl. No.: 17/285,917

(22) PCT Filed: Oct. 1, 2019

(86) PCT No.: PCT/EP2019/076519
§ 371 (c)(1),
(2) Date: Apr. 16, 2021

(87) PCT Pub. No.: WO2020/078709
PCT Pub. Date: Apr. 23, 2020

(65) Prior Publication Data
US 2021/0347342 A1 Nov. 11, 2021

(30) Foreign Application Priority Data
Oct. 19, 2018 (DE) ...................... 10 2018 126 094.6

(51) Int. Cl.
*G06F 7/70* (2006.01)
*B60T 8/173* (2006.01)
(Continued)

(52) U.S. Cl.
CPC .............. *B60T 8/173* (2013.01); *B60T 8/171* (2013.01); *B60T 8/327* (2013.01); *B60T 8/3675* (2013.01)

(58) Field of Classification Search
CPC .......... B60T 8/173; B60T 8/171; B60T 8/327; B60T 8/3675; G06F 7/70
(Continued)

(56) References Cited

U.S. PATENT DOCUMENTS 7,720,589 B2  5/2010 Hashiba
9,333,955 B2 * 5/2016 Stender ................. B60T 8/1755
(Continued)

FOREIGN PATENT DOCUMENTS

DE         10347189 A1   5/2005
DE    102005058234 A1   6/2006
(Continued)

*Primary Examiner* — Shardul D Patel
(74) *Attorney, Agent, or Firm* — LEYDIG, VOIT & MAYER, LTD.

(57) ABSTRACT

An actuator module for a vehicle includes an actuator control device configured to output an actuator activation signal and at least one actuator configured to receive the actuator activation signal and perform, based on the actuator activation signal, an actuator operation. The actuator control device includes a driving dynamics sensor device configured to measure at least one driving dynamics measurement variable of the vehicle and to generate a driving dynamics measurement signal. The actuator control device also includes a signal compensation device configured to receive the driving dynamics measurement signal and an actuator information signal indicating the actuator operation of the actuator control device, to filter the driving dynamics measurement signal in a manner dependent on the actuator information signal, and to output a compensated driving dynamics measurement signal. The actuator, actuator control device, driving dynamics sensor device, and signal compensation device are provided in one structural unit.

23 Claims, 3 Drawing Sheets

(51) Int. Cl.
 *B60T 8/171* (2006.01)
 *B60T 8/32* (2006.01)
 *B60T 8/36* (2006.01)

(58) Field of Classification Search
 USPC .......................................................... 701/70
 See application file for complete search history.

(56) References Cited

U.S. PATENT DOCUMENTS

| | | | |
|---|---|---|---|
| 11,180,127 B2 * | 11/2021 | Farres | B60T 13/58 |
| 2004/0102888 A1 | 5/2004 | Burgdorf et al. | |
| 2010/0305801 A1 * | 12/2010 | Giers | B60T 8/3685 |
| | | | 701/1 |
| 2012/0109470 A1 * | 5/2012 | Amtsfeld | B60T 13/683 |
| | | | 701/48 |
| 2013/0261905 A1 * | 10/2013 | Muraoka | B60T 8/172 |
| | | | 701/50 |
| 2015/0005982 A1 * | 1/2015 | Muthukumar | B60T 8/1725 |
| | | | 701/1 |
| 2018/0257652 A1 * | 9/2018 | Mueller | B60K 28/16 |

FOREIGN PATENT DOCUMENTS

| | | |
|---|---|---|
| DE | 102007057043 A1 | 5/2009 |
| DE | 102013021681 A1 | 6/2015 |
| DE | 102015217765 A1 | 3/2017 |
| EP | 2077215 A1 | 7/2009 |
| EP | 2254779 A1 | 12/2010 |
| EP | 2454135 A1 | 5/2012 |
| JP | 2009292208 A | 12/2009 |
| WO | WO 0216179 A2 | 2/2002 |
| WO | WO 2016135435 A1 | 9/2016 |

* cited by examiner

ACTUATOR MODULE AND METHOD FOR MEASURING AND PROCESSING A DRIVING DYNAMICS VARIABLE OF A VEHICLE

CROSS-REFERENCE TO PRIOR APPLICATIONS

This application is a U.S. national phase application under 35 U.S.C. § 371 of International Application No. PCT/EP2019/076519, filed on Oct. 1, 2019 and claims benefit to German Patent Application No. DE 10 2018 126 094.6, filed on Oct. 19, 2018. The international application was published in German on Apr. 23, 2020 as WO 2020/078709 A1 under PCT Article 21(2).

FIELD

The invention relates to an actuator module, in particular pneumatic actuator module, for an actuator system of a vehicle, in particular utility vehicle, wherein the actuator system may be in particular a brake system of the vehicle. The invention furthermore relates to a brake system of said type and to a method for measuring and processing a driving dynamics variable of a vehicle.

BACKGROUND

Brake systems of vehicles may for example be of pneumatic, hydraulic or even electromechanical design and correspondingly have pneumatic, hydraulic or electromechanical actuators. Here, an actuator is to be understood to mean a device which outputs or imparts actuator power in a manner dependent on the activation thereof. Pneumatic actuators may be in particular brake valves which, in a manner dependent on the pneumatic or electrical activation thereof, output brake pressures via brake lines to the vehicle brakes, for example brake cylinders. Electromechanical actuators may in particular activate brake levers or other mechanical brake devices of a mechanical vehicle brake. Correspondingly, hydraulic actuators may in particular be hydraulic brake valves which activate hydraulic vehicle brakes via hydraulic brake lines.

In the brake system, in particular electronic brake systems, closed-loop driving dynamics control arrangements are furthermore known which are generally controlled by a driving dynamics control device. The driving dynamics control device may in particular be integrated in the brake control device of the brake system or directly connected thereto and, for the purposes of closed-loop driving dynamics control, both actuate the vehicle brakes and furthermore possibly initiate further interventions in the vehicle, in particular by outputting engine request signals. To measure the driving dynamics behavior of the vehicle, a driving dynamics sensor device is generally provided, which may have one or more sensors in order to measure driving dynamics variables of the vehicle, in particular a longitudinal acceleration, lateral acceleration and/or rates of rotation or rotational accelerations about one of the three vehicle axes, that is to say the yaw axis (vertical axis), longitudinal axis (roll axis) and lateral axis (pitch axis). The driving dynamics measurement signals are output by the driving dynamics sensor device to the driving dynamics control device in order to carry out corresponding closed-loop driving dynamics control operations.

The driving dynamics sensor device is generally attached as a unit, or separately as multiple sensors, at a protected location in the vehicle in order to be substantially protected against interfering influences, in particular interfering mechanical influences.

For this purpose, it is firstly known for the driving dynamics sensor device to be provided entirely or partially on the circuit carrier of the driving dynamics control device. In this way, short signal paths are made possible.

DE 10 2013 021 681 A1 describes an electropneumatic brake system for a trailer vehicle with at least two axles, the wheel brake cylinders of which are each activated by a modulator via brake pressure lines with an anti-lock function, wherein the second modulator, preferably a rear axle modulator, as an additional function, performs closed-loop control of a stability function and, for this purpose, may comprise a lateral acceleration sensor or receive signals of an external lateral acceleration sensor.

WO 2016/135435 A1 describes a trailer brake system with brake ECU which is connected to a vehicle bus and which receives data from sensors via the bus. Here, multiple data buses are provided in order, firstly, to receive sensor data and, furthermore, realize communication with a brake ECU.

EP 2 454 135 B1 describes a control unit for a brake system of a vehicle, which control unit both receives wheel rotational speeds from wheel rotational speed sensors via ABS lines and has additional functionalities for controlling, for example, a closed-loop driving dynamics control device, for example as a driver assistance system. The control unit may have at least one sensor for sensing a driving state of the vehicle, which sensor may be an acceleration sensor, yaw rate sensor and/or inclination sensor. EP 2 077 215 B1 describes a similar brake system for braking a heavy goods vehicle or bus, wherein the brake system has an electronic control device outside the cabin on a supporting structure.

EP 2 254 779 B1 describes a brake system for a vehicle having an electronic and/or electropneumatic device, which may be inter alia an axle modulator, a trailer control valve, a control device of an electronic brake system or a closed-loop driving dynamics control device. Here, a parking brake modulator for the parking brake system may be provided, which is arranged in the vicinity of the rear axle of the vehicle and which may have a module of the closed-loop driving dynamics control arrangement. In the module of the closed-loop driving dynamics control arrangement, there may be integrated an acceleration sensor and a yaw rate sensor, the data of which are used for the closed-loop driving dynamics control.

Such systems already allow the implementation of a brake system with closed-loop driving dynamics control incorporating suitable sensors. It has however been found that the outlay in terms of hardware is generally very high, in particular for the incorporation of suitable sensors.

SUMMARY

In an embodiment, the present application provides an actuator module for an actuator system of a vehicle includes an actuator control device configured to output an actuator activation signal and at least one actuator configured to receive the actuator activation signal and perform, based on the actuator activation signal, an actuator operation. The actuator control device further includes a driving dynamics sensor device configured to measure at least one driving dynamics measurement variable of the vehicle and to generate a driving dynamics measurement signal. In addition, the actuator control device includes a signal compensation device configured to receive the driving dynamics measurement signal and an actuator information signal that indicates the actuator operation of the actuator control device, to filter the driving dynamics measurement signal in a manner dependent on the actuator information signal, and to output a compensated driving dynamics measurement signal. The at least one actuator, the actuator control device, the driving dynamics sensor device, and the signal compensation device are provided in one structural unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment the, the present application provides an actuator module, a brake system having an actuator module, and a method for measuring and processing a driving dynamics variable of a vehicle, which allow low outlay in terms of hardware and a flexible configuration.

A method according to the present disclosure can in particular be carried out by means of an actuator module according to the present disclosure and/or by means of a brake system according to the present disclosure.

Thus, an actuator module is provided which, in a structural unit, in particular in a rigid structural unit, preferably with a common module housing, provides an actuator control unit, a driving dynamics sensor device and at least one actuator. Thus, the actuator is coupled by means of a rigid coupling, in particular via the module housing, to further parts of the actuator module, in particular also of the driving dynamics sensor device.

By means of this integration of the sensor device in an actuator module together with the at least one actuator, it is in particular the case that an additional unit for accommodating the driving dynamics sensor arrangement is avoided. In this way, it is possible in particular for the outlay in terms of hardware, the costs and the installation space to be reduced.

It is thus possible in particular for the driving dynamics sensor device and the actuator control device to be accommodated on a common circuit carrier in the actuator housing, wherein the circuit carrier is rigidly coupled to, in particular fastened to, the housing. The actuator may for example be rigidly fastened to the housing and also partially project out of the housing.

An actuator is to be understood here to mean a power device which controls or directly implements an actuator power or an actuator operation, that is to say is provided for outputting actuator power. Here, the actuator power or actuator operation may be imparted by means of a fluid, that is to say pneumatically or hydraulically. Thus, the actuator may in particular be a pneumatic, for example purely pneumatic or electropneumatic valve, or may correspondingly be a hydraulic or electrohydraulic valve, or may have multiple valves. With analogous activation, the actuator may for example also be a pneumatically activated brake valve, which thus acts for example as a pneumatic relay valve and passes through and boosts the brake control pressure passing for example from a brake control line of a brake channel. In the case of an electronic brake system, the actuator may for example have an electronically activated compressed-air valve, for example a proportional valve.

Furthermore, the actuator may also be electrically operated, that is to say be an electromechanical actuator, for example for an electromechanical brake system or else in the case of a parking brake module with electromechanical parking brake. In the case of electromechanical brakes, too, vibrations and structure-borne sound waves are generated in the event of operation, and these are thus transmitted—as is also the case in pneumatic and hydraulic actuators—via the common housing, possibly the common circuit carrier, to the driving dynamics sensor device.

In order to take into consideration this effect of the interfering vibrations or structure-borne sound waves, a signal compensation device is provided which compensates or filters the (unfiltered) sensor measurement signals or driving dynamics measurement signals that are initially output by the driving dynamics sensor device. In this compensation, the effects on the sensors resulting from vibrations or structure-borne sound waves are taken into consideration and—at least partially, in particular substantially—compensated or filtered. Thus, the signal compensation device outputs compensated driving dynamics measurement signals, which can then be correspondingly used by the driving dynamics control device for the closed-loop driving dynamics control.

Here, the invention is based on the concept that the rigid coupling or structural integration of the driving dynamics sensor device in a module of an actuator can duly lead to a disadvantageous impairment of the sensor device owing to the mechanical vibrations, shocks and structure-borne sound waves; these impairments can however basically be electronically filtered out or compensated for. For example, in principle, information items regarding the actuator operations are directly available, because the actuator control device activates the actuator.

For example, the actuator is generally activated by a driver circuit with corresponding power flows, that is to say, for example, the solenoid of an electropneumatic or electrohydraulic valve or an electromechanical adjusting device is electrically energized. Since actuator information items regarding the actuator operation are thus already present, the disadvantageous structure-borne sound waves generated as a result of the actuator operation, or the effect of these on the sensor signals, can subsequently be identified or assigned and thus filtered out.

Furthermore, such vibrations and structure-borne sound waves can also be ascertained and taken into consideration through knowledge of the module design; in particular, it is for example possible for frequencies or resonance frequencies of the module that arise in intensified form during an actuator operation to be taken into consideration.

The signal compensation device can, from the actuator information signals, contain in particular information items regarding the nature of the actuator operation, for example the opening or closing of a valve, and furthermore the frequency and the magnitude or the level of the operation.

Furthermore, information items may also relate to present pressure conditions or the volume flows that will likely be controlled by a for example pneumatic or hydraulic actuator in the event of a corresponding operation. In particular, it is also possible for electrical PWM activation to also be used directly as an information signal in order to ascertain the form of the structure-borne sound waves.

It is thus possible, in the actuator information signal, for in particular a time information item to be transmitted, that is to say the time period in which a direct active mechanical adjustment is performed, for example a valve is actively adjusted from one into the other state (closed—open or open—closed) as a result of the electrical energization of the solenoid, because the greatest mechanical loads arise in the case of the direct adjustment. Information items regarding the various switching states are also relevant, because, for example in the case of an open valve, the flow of a fluid can lead to generation of vibrations which can be taken into consideration, in particular correspondingly to the resonance conditions.

The compensation may in particular include low-pass filtering, in which signal fluctuations of relatively high frequency are assigned to the actuator operation and filtered out.

If appropriate, a time or time period of an intense actuator operation, for example in the case of mechanical adjustment of the armature, in particular also the impact of an armature or movable part against a valve seat, may also be removed or excluded from the signal processing; this is based on the recognition that the absence of corresponding signals in a time period of one tenth of one second or less is possibly not relevant for the further signal processing, and can in particular be interpolated through the adjacent time ranges.

The actuator module advantageously has a vehicle bus connection, in particular CAN bus connection. The measurement signals received and filtered or compensated in the actuator module can thus subsequently be made available via the vehicle bus to other devices, in particular further modules of the brake device, for example a further axle module, and the central control module. The driving dynamics signals can also be transmitted via the vehicle bus to other devices.

Also possible, aside from use in an axle brake modulator, in particular rear axle brake modulator, is the formation of a wheel modulator, parking brake modulator, of a trailer control module (TCM), and furthermore also of an air treatment unit, of a brake encoder module unit (brake pedal module) or else of a module of the air spring device, in which an actuator of the air spring device, in particular a pneumatic control valve of an air spring, is operated.

Corresponding advantages are attained for the method according to the invention. Said method can be carried out with little outlay in terms of hardware, in particular in a control device, in particular the driving dynamics control device, such that, in this case, too, it is also possible in each case for improvements, for example in the form of updates to programming, to be added in a flexible manner, for example also with the replacement of the sensors and/or of the actuators or in the event of detection of a change in the sensors and/or actuators, for example also in the event of aging.

Figure 1:
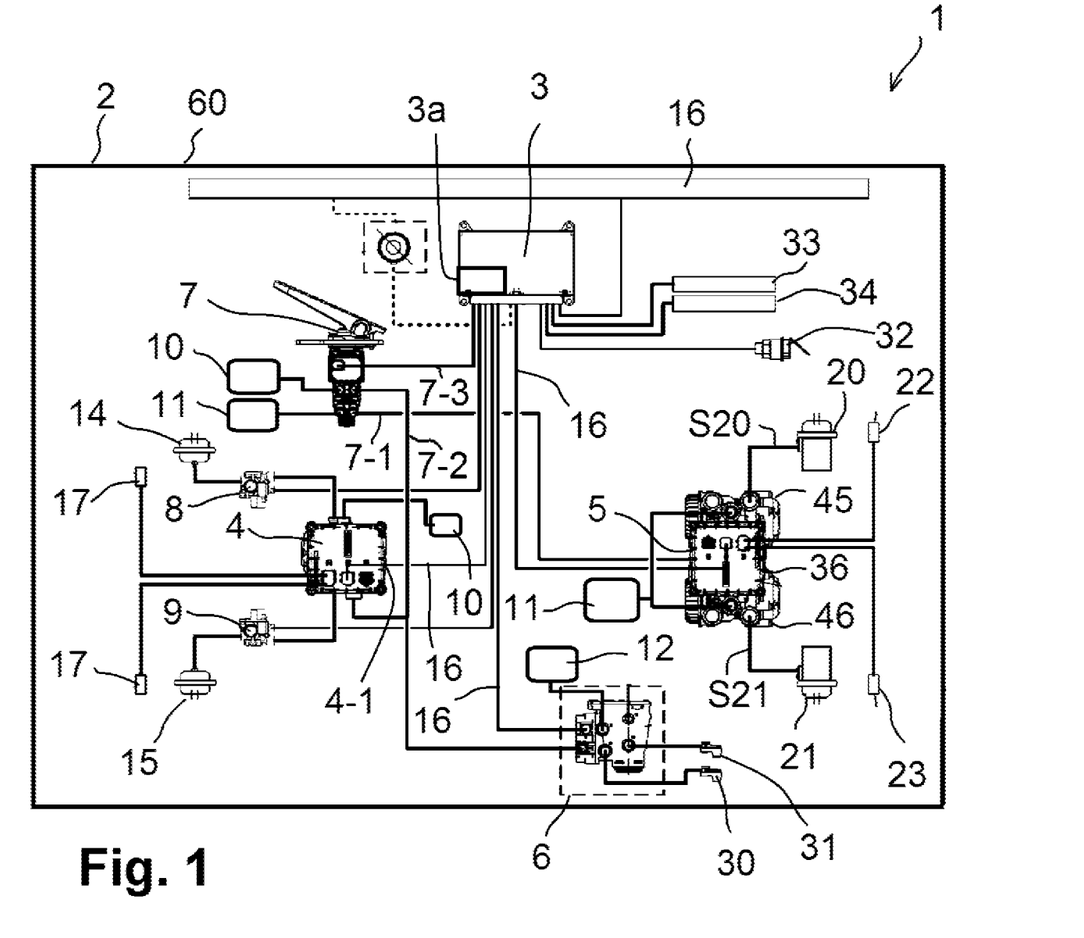
FIG. 1 shows an electropneumatic circuit diagram of an electronic brake system of a utility vehicle.

In FIG. 1, in a utility vehicle 1 which is not illustrated in any more detail here, there is provided an electronic brake system (EBS) 2, having an electronic brake control device (ECU) 3 which, in integrated form, also has a driving dynamics control device (ESC controller) 3a, furthermore a front axle modulator 4, a rear axle modulator 5, a trailer control module TCM 6 and a brake encoder module 7. In this embodiment, the brake encoder module 7 has for example an electrical output channel 7-1, that is to say it serves as an electrical brake encoder, and two pneumatic control outputs 7-2 and 7-3, which are connected to the reservoir 10 (first reservoir or first system pressure) and 11 (second compressed-air reservoir or second system pressure). The front axle modulator 4 is connected to the first compressed-air accumulator 10—which for the sake of simplicity is shown multiple times here—and thus passes the first system pressure through to a right front electropneumatic brake valve 8 and a left front electropneumatic brake valve 9, which in the embodiment shown here are activated directly by the ECU 3 by means of electrical brake control signals S8 and S9. The electropneumatic brake valves 8 and 9 correspondingly pneumatically activate a left front brake cylinder 14 and a right front brake cylinder 15 respectively.

Figure 2:
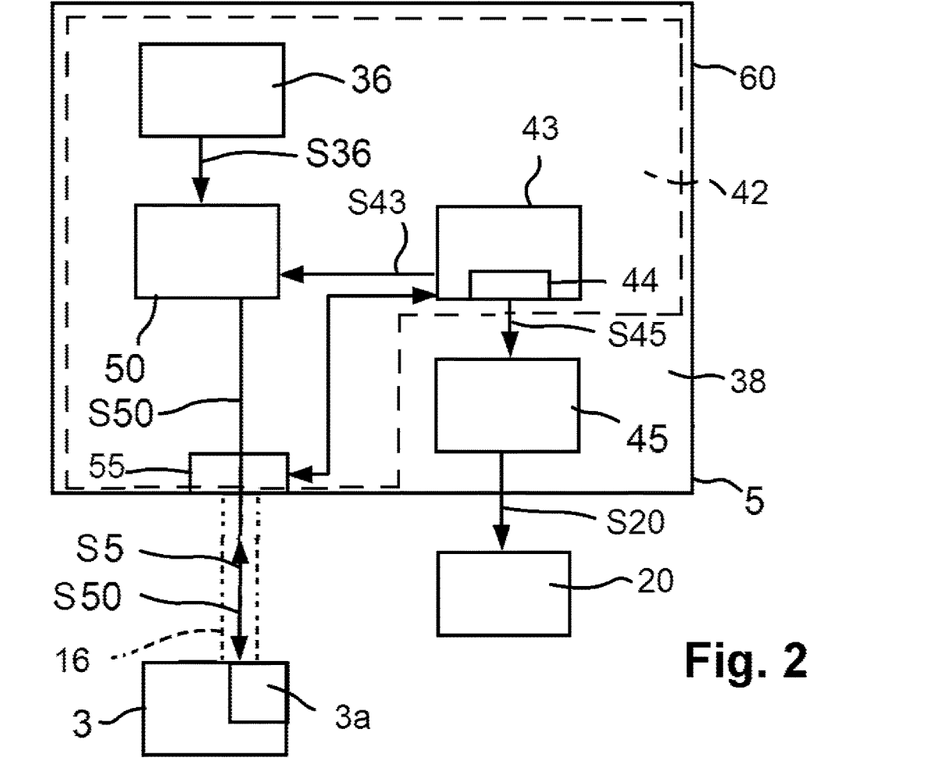
FIG. 2 shows a block circuit diagram of an actuator module according to an embodiment of the invention.

The rear axle brake modulator 5 is connected to the second compressed-air reservoir 11 and, for the provision of a pneumatic fall-back level, to the second pneumatic control output 7-2, and furthermore, according to the more detailed illustration of FIG. 2, has a CAN bus connection 55 for a vehicle-internal CAN bus 16. A right electropneumatic brake valve 45 designed as a proportional valve, and a corresponding left electropneumatic brake valve 46, are integrated in the rear axle brake modulator 5, wherein the right electropneumatic brake valve 45 activates a rear right brake cylinder 20 with a pneumatic brake pressure S20 and, correspondingly, the left electropneumatic brake valve 46 activates a rear right brake cylinder 21 with a pneumatic brake pressure S21.

The rear axle brake modulator 5 can in particular receive ECU control signals S5 from the electronic brake control device 3 via the CAN bus 16, and can furthermore, by means of its integrated electropneumatic brake valves 45 and 46, regulate the first system pressure of the first compressed-air reservoir 10, that is to say in particular adjust the level of said first system pressure, and output said first system pressure to the brake cylinders 20 and 21 as pneumatic brake pressures S20, S21; furthermore, said rear axle brake modulator can, if necessary, as a pneumatic fall-back level, pass through the pneumatic control pressure that is output via the first pneumatic control output (first pneumatic brake channel) 7-1. Here, wheel rotational speed sensors 22 and 23 correspondingly output their electrical wheel rotational speed signals n22 and n23 to the rear axle brake modulator 5, which then furthermore makes said data available via the CAN bus 16.

The trailer control module 6 may be designed as an electropneumatic module with integrated control device or as a simple valve (trailer control valve), wherein said trailer control module connected for example to the second pneumatic control output 7-2 and via an electrical TCV control line 24 to the electronic control device 2. Provided in a manner known per se on the trailer control module 6 are the red coupling head 30 for the supply of the reservoir pressure (system pressure) to the trailer and the yellow coupling head 31 for the pneumatic activation of the trailer or trailer brake system. Furthermore, in the embodiment shown here, a CAN bus connection 32 for the trailer is also provided, which CAN bus connection is provided here on the electrical control device 2. The electronic control device 3 may furthermore be connected to an electrical supply (power supply) 33 and correspondingly have electrical connection lines for switches and lamps 34.

In the embodiment shown, in the electronic brake control device 3, there is integrated a driving dynamics control device 3a, that is to say an electronic stability control (ESC) system which serves for the closed-loop control of the stability of the utility vehicle 1 through activation of the wheel brakes, that is to say of the brake cylinders 17, 20, 21. The closed-loop stability control can in particular identify skidding situations and roll inclinations and/or yaw inclinations and pitch inclinations of the utility vehicle 1 and counteract these through asymmetrical braking interventions. Additionally, the driving dynamics control device 3a may possibly perform control of the engine by outputting engine request signals via the CAN bus 16 to an engine control device. Correspondingly, closed-loop control of the connected trailer is jointly performed via the trailer CAN connection 32.

For closed-loop stability control, the brake control device 3 receives, via the CAN bus 16, general vehicle dynamics signals, for example the traveling speed and possibly a state signal of the engine. Furthermore, said brake control device can receive the wheel rotational speed signals n16, n20 and n21 of the wheel rotational speed sensors 17, 20 and 21, which are received by the front axle brake module 4 and rear axle brake module 5 and transmitted via the CAN bus 16.

Furthermore, a driving dynamics sensor device 36 is provided, which may be formed as a uniform block or by multiple elements and which may in particular measure one or more of the following physical driving dynamics variables of the utility vehicle 1:

a longitudinal acceleration aL, a lateral acceleration aq, a yaw rate ω, a yaw acceleration a_ω, and furthermore also rates of rotation and/or rotational accelerations about the two further axes, that is to say a roll rate as a rate of rotation about the longitudinal axis, a pitch rate about the lateral axis, and vehicle inclinations, that is to say the inclinations of the vehicle in the lateral direction and/or in the longitudinal direction.

As shown in the embodiment of FIG. 2, the driving dynamics sensor device 36 firstly generates driving dynamics measurement signals S36, which are however not output directly to the brake control device 3; the driving dynamics measurement signals S36 are rather output to a signal compensation device 50 (signal filter device), which filters the driving dynamics measurement signals S36 and outputs compensated driving dynamics measurement signals S50 via the CAN bus 16 to the brake control device 3 and the ESC closed-loop control device 3a provided in the control device 3, as will be described below.

The rear axle brake modulator 5 has a common housing 38 and a circuit carrier 42, which may for example be in the form of a circuit board and is generally mechanically fastened to the housing 38. In the rear axle brake modulator 5, an actuator control device 43 and the driving dynamics sensor device 36 are accommodated on the circuit carrier 42, wherein a driver circuit 44 for the electrical activation of the brake valve 45 may for example be integrated in or else formed separately from the module control device 43. Furthermore, the right rear brake valve 45—and, not shown here, also the left rear brake valve 46—are accommodated in the housing 38 or fastened to or rigidly connected to the housing 38.

The electropneumatic brake valves 45, 46, during the operation thereof, that is to say in particular the adjustment thereof, generate mechanical oscillations, which act as vibrations or as impacts or shocks and are also coupled into the circuit carrier 42 and thus the driving dynamics sensor device 36, such that, in particular, measurements of speeds, accelerations, rates of rotation and rotational accelerations are influenced. In the embodiment of FIG. 2, the control device 43, in addition to the activation of the electropneumatic brake valve 45 by means of the actuator activation signal S45, outputs an actuator information signal S43 with information items regarding the activation, in particular the nature (type) of activation, the frequency and the magnitude or the analogue current value or the pneumatic air quantity to be output, to the signal compensation device 50, which receives the directly generated driving dynamics measurement signals S36 of the driving dynamics sensor device 36 and filters or compensates these in a manner dependent on the actuator information signals S43 and thus generates compensated driving dynamics measurement signals S50, which are for example output via the CAN bus interface 55 and the CAN bus 16 to the brake control device 3.

It is thus possible for the mechanical influences that are exerted as structure-borne sound waves by the respective actuator, in this case therefore an electropneumatic brake valve 45, on the driving dynamics sensor device 36 via a housing 38 and the circuit carrier 42 to subsequently be compensated or filtered electrically or in terms of signal technology, and thus for the subsequently used driving dynamics measurement signals 36 to be made available with corresponding electrical filtering.

In principle, the actuator information signal S43 may also be formed directly by the actuator activation signal S45, for example if a PWM signal is used. In this embodiment, the more extensive information items regarding the actuator adjustment, that is to say regarding the nature and extent and/or the times of the actuation, are then stored or provided in the compensation device 50.

Figure 3:
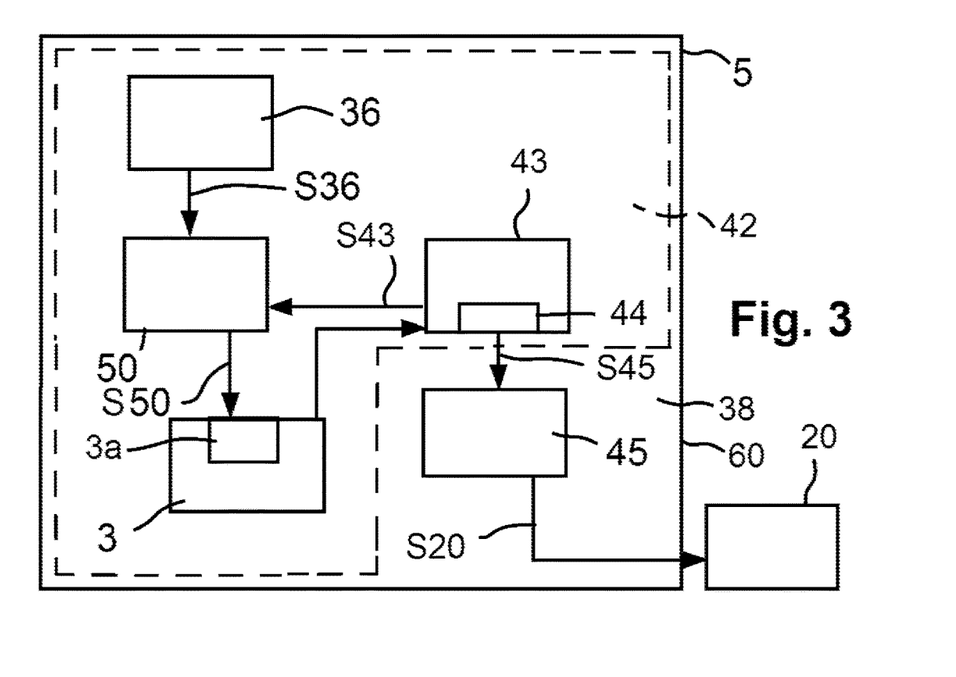
FIG. 3 shows a block circuit diagram of an actuator module according to a further embodiment with integrated driving dynamics control device.

In the embodiment of FIG. 3, which is an alternative in relation to FIG. 2, the brake control device 3 and thus the driving dynamics control device (ESC controller) 3a is part of the actuator module 5, that is to say is accommodated in the housing 38, preferably also on the circuit carrier 42. Thus, the compensated driving dynamics measurement signals S50 of the brake control device 3 are already made available via the circuit carrier, that is to say not via the CAN bus 16; they may however additionally be made available via the CAN bus 16 to further devices.

The driving dynamics sensor device 36 may for example also be provided in the front axle modulator 4. The driving dynamics sensor device may basically also be provided in the trailer control module 7 if it is in the form of an intelligent TCM with dedicated control device.

Figure 4:
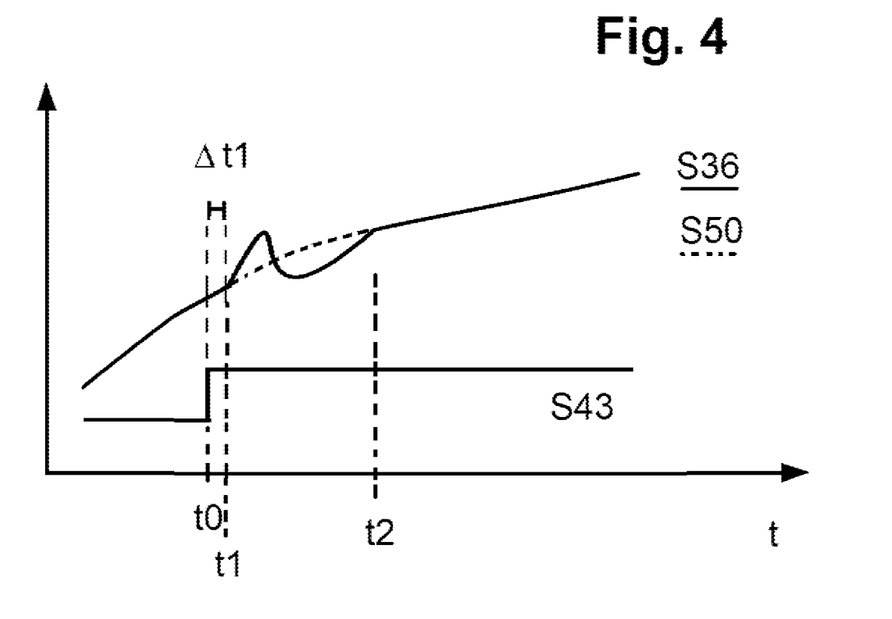
FIG. 4 shows a signal diagram of relevant signals.

FIG. 4 schematically shows an embodiment of signal processing according to the invention. The directly received driving dynamics measurement signal S36 may in this case be for example a longitudinal acceleration signal. The actuator information signal S43 is also schematically plotted, and dashed lines are used to plot the compensated driving dynamics measurement signal S50, which is identical in terms of its further profile to the driving dynamics measurement signal S36. At a time t0, an actuator operation is activated by means of the actuator activation signal S45, which actuator operation is correspondingly communicated with the actuator information signal S43, which may also be the actuator activation signal S45, for example a PWM signal. With a time delay ☐t1, which correspondingly arises as a result of the magnet activation and slowing of the build-up of corresponding forces over time, the adjustable part of the actuator module 5, that is to say for example the armature, is mechanically adjusted at a time t1, such that, as a result, firstly the mechanical movement of the armature can trigger structure-borne sound waves, and furthermore the fluid flows that are switched in this way can lead to for example shock-like structure-borne sound waves. In FIG. 4, the structure-borne sound waves generate an interference signal in a time period from t1 to t2, whereupon, subsequently, proceeding from the time t2, the adjustment has been performed and the new fluid flows have taken effect, wherein the armature has correspondingly arrived in the second position. Thus, proceeding from t2, the signal can be used again without relevant filtering. It is however for example also possible for filtering to be provided before t0 and after t2 owing to the different, permanently occurring fluid flows provided in the switching states.

It is thus in particular also possible for time delays between the activation of an actuator and the adjustment of the actuator to be taken into consideration in the compensation or filtering. Here, the driving dynamics measurement signal S36 may firstly be subjected to low-pass filtering with corresponding filter times. Furthermore, it is for example also possible for the time period of the active adjustment from t1 to t2 to be excluded and to be interpolated from the adjacent ranges, if said time period is sufficiently short. The driving dynamics measurement signal S50 compensated or filtered as per FIG. 4 can thus be output.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Utility vehicle
2 Electronic brake device (EBS)
3 Electronic control device (ECU) of the EBS 2, ESC controller
3a ESC closed-loop control device 3a, ESC controller
4 Front axle brake modulator
5 Rear axle brake modulator
6 Trailer control valve (TCV or TCM)
7 Brake pedal, brake encoder
7-1 First pneumatic brake channel, first pneumatic control output
7-2 Second pneumatic brake channel, second pneumatic control output
7-3 Electrical encoder signal, electrical brake channel
8 Right front brake valve
9 Left front brake valve
10 First compressed-air reservoir (first system pressure)
11 Second compressed-air reservoir (second system pressure)
12 Third compressed-air reservoir (third system pressure)
14 Right front brake cylinder
15 Left front brake cylinder
17 CAN bus
18 Front wheel rotational speed sensors
18 Axle
20 Pneumatic consumer, for example rear right brake cylinder
21 Pneumatic consumer, for example rear left brake cylinder
22, 23 Rear wheel rotational speed sensors
24 Electrical TCV control line
30 Yellow trailer coupling head
31 Red trailer coupling head
32 CAN bus connection for the trailer
33 Electrical supply (power supply) for the ECU 3
34 Switches and lamps activated by the ECU 3
36 Driving dynamics sensor device
38 Housing
42 Circuit carrier, for example circuit board
43 Rear axle brake control device
45 Actuator, in particular pneumatic actuator, for example right rear brake valve (proportional valve)
45a Electrical driver circuit
45b Pneumatic actuator
45c Electrically operated proportional valve
45d Electromechanical actuator
45e Electromechanical brake actuator
45f Hydraulic actuator
46 Left rear electropneumatic brake valve (proportional valve)
46a Electrical driver circuit
50 Signal compensation device, for example filter device
55 Bus interface
60 Structural unit
61 Actuator operation
62 Changes with respect to time, for example high-frequency changes
80 Wheel brake module
81 Parking brake module
83 Actuator module of the air suspension system 84
84 Air suspension system of the vehicle 1
90 Structure-borne sound waves
91 Switching states
92 Flow conditions
93 Fluid
94 Position information items regarding the relative position of the actuator 45
95 Relative position of the actuator 45 with respect to the driving dynamics sensor device 36
96 Nature of the actuator operation 61
97 Hydraulic brake cylinder
98 Electromechanical wheel brakes
$\Delta t1$ Time delay
t2-t1 Time period
I_61 Information items regarding the actuator operation
TP Low-pass filtering of the driving dynamics measurement signal S36
Af Frequency of the actuator operation 61
AG Magnitude of the actuator operation 61

S5 Brake control signal from the brake control device (ECU) 3 to the rear axle brake modulator 5, for example via the CAN bus 16
S8 Electrical brake control signal to the right front brake valve 8
S9 Electrical brake control signal to the left front brake valve 9
S36 Driving dynamics measurement signals
S50 Filtered driving dynamics measurement signals
S43 Actuator information signal
S45 Actuator activation signals to the actuator
S20 Pneumatic activation signal to consumer, for example right rear brake cylinder 20
n16, n20, n21 Wheel rotational speed signals
aL Longitudinal acceleration
aq Lateral acceleration
ω Yaw rate
a_ω Yaw acceleration
phi Roll angle
v_phi Roll rate
a_phi Roll acceleration
theta Pitch angle
v_theta Pitch rate
a_theta Pitch acceleration

The invention claimed is:

1. An actuator module for an actuator system of a vehicle, the actuator module comprising:
an actuator control device configured to output an actuator activation signal;
at least one actuator configured to receive the actuator activation signal and perform, based on the actuator activation signal, an actuator operation,
a driving dynamics sensor device configured to measure at least one driving dynamics measurement variable of the vehicle and to generate a driving dynamics measurement signal,
a signal compensation device configured to receive the driving dynamics measurement signal and an actuator information signal that indicates the actuator operation of the actuator control device, to filter the driving dynamics measurement signal in a manner dependent on the actuator information signal, and to output a compensated driving dynamics measurement signal,
wherein the at least one actuator, the actuator control device, the driving dynamics sensor device, and the signal compensation device are provided in one structural unit.

2. The actuator module as claimed in claim 1, wherein the structural unit includes a module housing in which the actuator control device, the driving dynamics sensor device and the signal compensation device are attached or arranged and on or in which the actuator is fastened.

3. The actuator module as claimed in claim 1, wherein the actuator module further comprises a circuit carrier fixedly received in the housing and on which the actuator control device, the sensor device, and the signal compensation device are attached.

4. The actuator module as claimed in claim 1, wherein:
the actuator system is a pneumatic system of the vehicle, and
the actuator is a pneumatic actuator for a pneumatic consumption process.

5. The actuator module as claimed in claim 4, wherein the actuator is an electrically actuated proportional valve.

6. The actuator module as claimed in claim 1 wherein the actuator is an electromechanical actuator or a hydraulic actuator.

7. The actuator module as claimed in claim 1, wherein the actuator module is a brake module configured to activate the vehicle brakes of an axle of the vehicle.

8. The actuator module as claimed in claim 1, wherein the actuator module is an actuator module from the a group including: a wheel brake module for activating a single wheel brake, a parking brake module, a trailer control module, an air treatment unit, a brake encoder module, and an actuator module of an air suspension system of the vehicle.

9. The actuator module as claimed in claim 1, wherein the driving dynamics sensor device is configured to measure one or more of the driving dynamics variables from a group including:
a longitudinal acceleration, a lateral acceleration, a yaw rate, a roll rate, a pitch rate, a yaw acceleration, a roll acceleration, a pitch angle, and a roll angle.

10. The actuator module as claimed in claim 1, wherein the signal compensation device is configured to filter the driving dynamics measurement signal by:
assigning changes with respect to time in the driving dynamics measurement signal to an actuator operation described by the actuator information signal and transmitted by structure-borne sound waves to the driving dynamics sensor device, and
reducing or filtering out the changes with respect to time.

11. The actuator module as claimed in claim 10, wherein the signal compensation device is configured to:
perform low-pass filtering of the driving dynamics measurement signal, and/or
interpolate the driving dynamics measurement signal in an operation time period of the actuator.

12. The actuator module as claimed in claim 1 wherein the signal compensation device performs the signal filtering in a manner dependent on one or more information items selected from a group including:
time and/or time period of an active adjustment of the actuator and/or of an actuator operation,
different passive states of the actuator with the respective flow conditions of a fluid conducted through,
position information items regarding a relative position of the actuator with respect to the driving dynamics sensor device,
nature of the actuator operation, and
frequency and/or magnitude of the actuator operation.

13. The actuator module as claimed in claim 12, wherein the information items are contained in the actuator information signal or are stored in the signal compensation device.

14. The actuator module as claimed in claim 13, wherein the information items are stored in the signal compensation device, and the signal compensation device receives the actuator activation signal as actuator information signal.

15. The actuator module as claimed in claim 1, wherein the actuator module is configured to output the compensated driving dynamics measurement signal via an interface.

16. The actuator module as claimed in claim 1, wherein a driving dynamics control device is provided in the actuator module, and the compensated driving dynamics measurement signal is output in the actuator module to the driving dynamics control device.

17. The actuator module as claimed in claim 1, wherein the actuator module is further configured to receive and transmit wheel rotational speed signals from wheel rotational speed sensors.

18. A brake system for a vehicle, the brake system comprising:
a driving dynamics control device, multiple wheel brakes, and an actuator module as claimed claim 1, wherein the actuator control device is configured to receive ECU control signals from the driving dynamics control device, wherein the actuator is configured to activate at least one of the wheel brakes, wherein the driving dynamics control device is configured to perform closed-loop driving dynamics control, receive the compensated driving dynamics measurement signals of the actuator module and output the brake control signals to the actuator module for the purposes of selectively braking one or more wheel brakes.

19. The brake system as claimed in claim 18, wherein the driving dynamics control device is integrated in a brake control device of the brake system, wherein the wheel brakes have pneumatic brake cylinders and/or hydraulic brake cylinders and/or electromechanical wheel brakes.

20. The brake system as claimed in claim 18, wherein the brake system is an electronic brake system, wherein the actuator module is connected via a vehicle-internal data bus to further devices of the brake system and/or further devices of the vehicle.

21. The brake system as claimed in claim 20, wherein the actuator module is an axle brake module connected via the vehicle-internal data bus to at least one further axle brake module and/or the driving dynamics control device and is configured to output the compensated driving dynamics measurement signals via the vehicle-internal data bus.

22. A vehicle having a brake system as claimed claim 18.

23. A method for measuring and processing a driving dynamics variable of a vehicle, the method comprising:

outputting an actuator activation signal to an actuator for an actuator operation, generating an actuator information signal that indicates the actuator operation, performing, based on the actuator activation signal, the actuator operation, measuring, during the actuator operation, at least one driving dynamics measurement variable of the vehicle by a driving dynamics sensor device mechanically connected to the actuator generating a driving dynamics measurement signal, receiving the driving dynamics measurement signal and the actuator information signal, filtering the driving dynamics measurement signal in a manner dependent on the actuator information signal, and outputting a compensated driving dynamics measurement signal.

\* \* \* \* \*